(No Model.)
A. E. BALL.
SEEDING MACHINE.
No. 356,438. Patented Jan. 25, 1887.
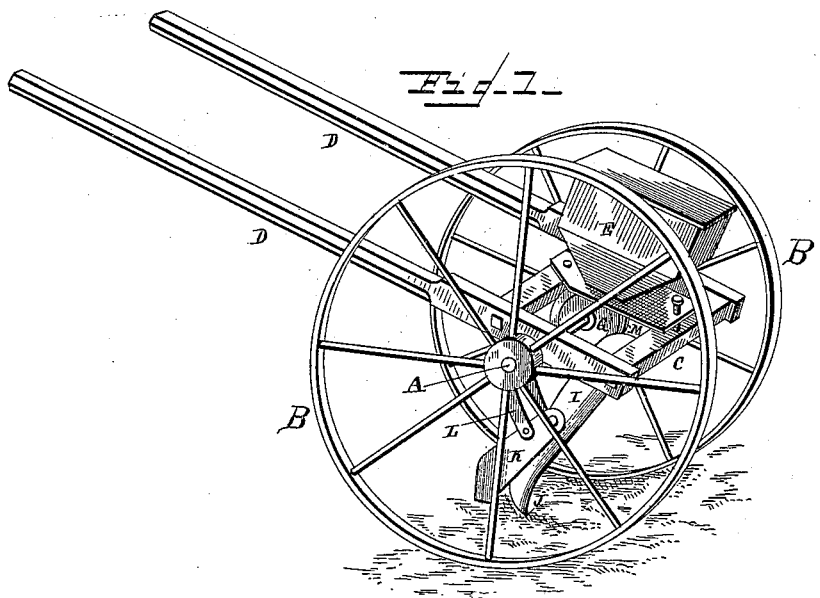
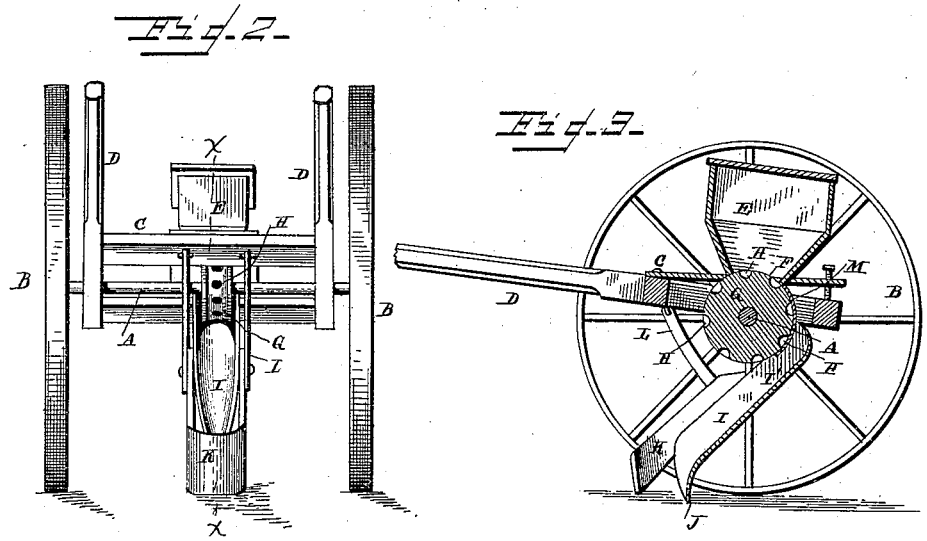
Witnesses
Edwin L. Jewett
J. Fred. Reily
Inventor
A. E. Ball
By his Attorney
Patrick O'Farrell

UNITED STATES PATENT OFFICE.

ARTEMAS E. BALL, OF RUSHFORD, MINNESOTA.

SEEDING-MACHINE.

SPECIFICATION forming part of Letters Patent No. 356,438, dated January 25, 1887.

Application filed April 13, 1886. Serial No. 198,736. (No model.)

*To all whom it may concern:*

Be it known that I, ARTEMAS E. BALL, a citizen of the United States, residing at Rushford, in the county of Fillmore and State of Minnesota, have invented certain new and useful Improvements in Seeding-Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.
My invention consists in the improved construction, arrangement, and combination of parts of a seeding-machine which is simple in construction, durable, and very efficient in its operation, and which is designed to be easily propelled by hand by one person, or horse-power may be employed, if desired, all as will be hereinafter fully described, and pointed out in the claim.

Referring to the accompanying drawings, Figure 1 is a perspective view of my improved seeding-machine. Fig. 2 is a rear elevation of the same; and Fig. 3 is a longitudinal vertical sectional view taken on line $x\ x$, Fig. 2, of the drawings.
The same letters of reference indicate corresponding parts in all the figures.

Referring to the several parts by letter, A indicates the axle, to the ends of which are rigidly secured the drive-wheels B B, of ordinary and suitable construction. On this axle is supported the frame C, having the handles D, by means of which the machine is propelled by hand; or the handles may be so shaped as to adapt the machine to be driven by horse-power;
and on the frame C is mounted the hopper E, the sides and ends of which converge in the usual manner, and the bottom of this hopper is formed with the longitudinal slot F, in which fits closely and turns the periphery of a feed-disk, G, which is tightly keyed upon the center of the shaft or axle A and turns therewith. This feed-disk has formed in its periphery the seed-cups H, the size and number of which are regulated according to the character of the seed to be sown, and several of these feed-disks may be kept on hand, having seed-cups of different size and number, so that when planting corn a disk having two seed-cups may be keyed upon the axle, so as to plant two hills of corn for each revolution of the main wheels B B; and in planting different kinds of vegetables this disk can be changed for one having the desired number of seed-cups of the requisite size.

To the forward side of the frame C is secured the seed-tooth I, which is deeply grooved on its rear side, so as to be approximately U-shaped in cross-section, and the lower end of which is inclined forward, so as to form a tooth or point, J, which opens the furrow into which the seed is deposited, the tooth I being made of a single piece of metal, being simple and strong in construction, and being thus simple, easy, and cheap to manufacture, as will be readily understood; and to the rear portion of this tooth I is secured the follower K, which is formed, as shown, of a single piece or strip of metal bent into the requisite shape, and preferably connected to the frame C by the braces L, and which covers the seed with the earth immediately after it has been dropped into the furrow through the grooved tooth I.

To the bottom of the hopper E, at the forward end of the longitudinal slot F, is secured the downwardly-projecting hood M, formed of a single piece or strip of metal curved in the arc of a circle, so as to adapt it to fit around that portion of the feed-disk which has passed through the lower end of the hopper and is turning downward, the object of this shield or hood being to prevent the seed in the seed-cups of the feed-disk from dropping out of the same until the said cup comes immediately over the groove of the tooth I, when the said cup, passing clear of the lower end of the curved hood, will drop the seed which it contains into the grooved tooth I.

The operation of my improved seeding-machine is as follows: As the machine is propelled forward, either by hand or horse-power, the main wheels B B, turning the axle, will thereby rotate the feed-disk, and the corn or seed, of whatever kind is being sown, will fill the cups of the feed-disk, and the seed thus taken into the cups is prevented by the curved hood M above described from spilling out of the said cups until it reaches the proper point immediately over the feed-groove I' in the rear side of the tooth I, into which groove the seed drops. As the machine is propelled forward the forwardly-inclined point of the rearwardly-inclined tooth I opens the furrow, the tooth I being of sufficient length to cause its point to enter the ground. The seed, in falling from the cups of the feed-disk, is conducted by the grooved tooth into the furrow opened by the point of the tooth, and is at once covered by the follower K, which covers into the furrow the earth turned to each side by the point of the tooth I, as will be readily understood.

From the foregoing description, taken in connection with the accompanying drawings, the construction, operation, and advantages of my improved seeding-machine will be readily understood.

It will be seen that my improved seeding-machine is exceedingly simple in construction, is light in weight, and can be easily handled by one person, can be readily constructed, and is not liable to break or get out of order, and is very efficient in its operation.

I am aware that a machine of this class has been heretofore constructed provided with a main casing inclosing the feed-disk and arranged to cause the seed to fall directly into the furrow, and having, further, a forwardly-inclined tooth secured upon the said casing for opening the furrow, and a coverer attached to the casing for covering in the furrow, and I do not therefore claim such construction; but

What I claim as my invention, and desire to secure by Letters Patent of the United States, is—

The combination, with the axle having the main wheels rigidly secured to its ends, of the feed-disk secured upon the said axle and having the seed-cups formed in its periphery, the hopper having the longitudinal slot in its bottom, the curved hood formed of a single strip of metal and arranged as described, the tooth having the longitudinal groove in its rear side and having the forwardly-inclined point which opens the furrow, and the coverer formed of a single piece or strip of metal bent into the requisite shape and arranged as described.

In testimony whereof I affix my signature in presence of two witnesses.

ARTEMAS E. BALL.

Witnesses:
L. J. AMBLE,
WM. BRUCE.